United States Patent [19]

Statile

[11] Patent Number: 5,029,388
[45] Date of Patent: Jul. 9, 1991

[54] APPARATUS AND PROCESS FOR SLEEVING THE HEAT EXCHANGER TUBES OF NUCLEAR STEAM GENERATORS

[75] Inventor: Daniel J. Statile, Monroeville, Pa.

[73] Assignee: Westinghouse Electric Corp., Pittsburgh, Pa.

[21] Appl. No.: 281,142

[22] Filed: Dec. 8, 1988

[51] Int. Cl.[5] .............................................. B23P 6/00
[52] U.S. Cl. ................................. 29/890.031; 29/252; 29/723; 29/726; 29/906; 29/DIG. 46; 29/890.04
[58] Field of Search ............... 29/157.4, 252, 157.3 R, 29/234, 244, 282, 720, 721, 723, 726, 744, 906, DIG. 46, 157.3 B, 157.3 C, 157.3 D, 157.3 H, 157.3 V, 890.031, 890.036, 890.039, 890.04; 376/260; 254/29 R; 165/11.2

[56] References Cited

U.S. PATENT DOCUMENTS

| 2,768,431 | 10/1956 | Hughes | 29/DIG. 46 X |
|---|---|---|---|
| 3,191,279 | 6/1965 | Ashurkoff | 29/DIG. 46 X |
| 3,241,222 | 3/1966 | Timmermans | 29/DIG. 46 X |
| 4,229,259 | 10/1980 | Vaill et al. | 29/723 X |
| 4,376,092 | 3/1983 | Kmonk et al. | 376/353 |
| 4,406,856 | 9/1983 | Wilkins et al. | 29/727 |
| 4,519,121 | 5/1985 | Yokosawa | 29/157.3 C |
| 4,551,299 | 11/1985 | Shields | 376/261 |
| 4,571,821 | 2/1986 | Pirl et al. | 29/727 |
| 4,586,250 | 5/1986 | Cooper, Jr. et al. | 29/906 X |
| 4,592,577 | 6/1986 | Ayres et al. | 29/157.3 R |
| 4,597,294 | 7/1986 | Brill, III et al. | 376/252 |
| 4,611,375 | 9/1986 | Zapawa | 29/157.3 C |
| 4,623,512 | 11/1986 | Desfontaines | 376/364 |
| 4,653,164 | 3/1987 | Cooper, Jr. et al. | 29/723 X |
| 4,672,741 | 6/1987 | Zafred et al. | 29/906 X |
| 4,682,725 | 7/1987 | Martin et al. | 29/402.08 X |
| 4,683,107 | 7/1987 | Bäro et al. | 29/906 X |
| 4,723,358 | 2/1988 | Jung et al. | 29/723 |
| 4,728,217 | 3/1988 | Fink | 29/252 X |
| 4,771,526 | 9/1988 | Arzenti et al. | 29/906 X |
| 4,829,648 | 5/1989 | Arzenti et al. | 29/157.4 |

Primary Examiner—Mark Rosenbaum
Assistant Examiner—Frances Chin

[57] ABSTRACT

An apparatus and method are provided for remotely inserting and feeding a sleeve within a selected tube to be serviced mounted in a tubesheet of a nuclear steam generator, so as to relieve reverse forces generated during the insertion and feeding of the sleeve and to reduce operator interaction. The device includes a tool having a frame, at least one gripper unit having gripping fingers which extend from a top plate of the tool for detachably suspending the frame from a tube in close proximity to the selected tube. The gripper unit also includes a hydraulically actuated cylinder for retracting the gripping fingers toward the top plate of the tool to forcibly position the tool against the underside of the tubesheet. An advancing assembly supported by the frame is also provided for remotely inserting and feeding the sleeve into the selected tube. This advancing assembly is vibrated by way of a vibrator mounted thereon. Therefore, by forcibly positioning the tool against the underside of the tubesheet and vibrating the advancing assembly during the feeding of the sleeve, reverse forces exerted on the tool and the tubesheet are relieved to allow the sleeve to be smoothly fed into the selected tube, which accelerates the sleeving operation and minimizes the exposure of the equipment operator to potentially harmful radiation.

28 Claims, 3 Drawing Sheets

APPARATUS AND PROCESS FOR SLEEVING THE HEAT EXCHANGER TUBES OF NUCLEAR STEAM GENERATORS

BACKGROUND OF THE INVENTION

1. Field of the Invention

This invention relates to an apparatus and process for sleeving damaged heat exchanger tubes in nuclear steam generators, and is specifically concerned with a device and method for expeditiously positioning a sleeving device and feeding a sleeve within a heat exchanger tube so as to enable a greater number of tubes to be sleeved in a given period of time.

2. Description of the Prior Art

During the life of a nuclear steam generator, some of the heat exchanger tubes become corroded, damaged, or cracked. These tubes must be repaired if the entire service life of the steam generator is to be realized. These repairs are accomplished by installing a tubular sleeve within the tube which traverses the damaged portion of the tube which traverses the damaged portion of the tube walls. The sleeve is dimensioned so that there is little clearance between the outer walls of the sleeve and the inner walls of the tube, and the ends of the sleeve are expanded or brazed to the inner walls of the tube to form a hydraulic "bridge" across the damaged portion of the tube. Such sleeving is accomplished by a succession of tools which are suspended from the tube sheet within the steam generator. These tools generate a number of reactive forces in performing their functions and consequently, they must be firmly and reliably secured to the tube sheet. The purpose of the instant invention is to expeditiously secure a sleeving tool to the underside of a tubesheet.

Devices for inserting and positioning reinforcing sleeves within the heat exchanger tubes of steam generators are known in the prior art. One such device developed by the personnel of the Westinghouse Electric Corporation is capable of feeding such reinforcing sleeves through the open ends of the tubesheet of a nuclear steam generator by means of a pair of hydraulic grippers, each of which includes an expandable bladder. The frame of this device is light enough to allow it to be manipulated within the radioactive, primary side of a nuclear steam generator by a remotely operable service arm (or ROSA) that has also been invented and developed by personnel of the Westinghouse Electric Corporation. Once situated, the sleeve-feeding mechanism of this device is locked into position adjacent to the sleeve to be repaired by one or more hydraulically operated cam-lock devices that are insertable within and expandable against the open ends of tubes that are not being repaired. After the device has been secured into a proper position, the hydraulic grippers are actuated. The feeding of the sleeve is accomplished by alternatively actuating and deactuating the hydraulic grippers, and by reciprocating one of the grippers relative to the other. A complete description of this sleeve loading mechanism is set forth in U.S. Pat. application Ser. No. 785,291 filed Oct. 3, 1985 now U.S. Pat. No. 4,771,526, by Thomas E. Arzenti and William E. Pirl, and a complete description of a hydraulically operated cam-lock device for mounting such tools within such steam generators is described in U.S. Pat. No. 4,728,217 issued Mar. 1, 1988 to David J. Fink. Both of these applications are assigned to the Westinghouse Electric Corporation, and both are expressly incorporated herein by reference.

Generally speaking, the ultimate purpose of such maintenance devices is to prevent radioactive water from the primary side of the generator from leaking through the cracked walls of corroded heat exchange tubes. If such a leak should occur, radioactive water from the primary side would contaminate the nonradioactive water present in the secondary side of the generator. Since the water in the secondary side is used to form the steam which ultimately drives the electric turbines in the plant, it is important that this water remain uncontaminated.

Such sleeving operations have proven to be very effective in extending the useful lifetime of the nuclear steam generator. Unfortunately, they are also quite expensive since the steam generator has to be completely shut down and taken off-line. Such downtime can cost the utility involved over $1,000,000 per day in lost revenues. It is therefore desirable that such sleeving operations be accomplished as rapidly as possible. While the sleeve loading tool described and claimed in the previously mentioned U.S. Pat. application Ser. No. 785,291 is among the fastest and most effective tools known for positioning reinforcing sleeves across corroded sections of heat exchanger tubes, it has several design limitations that prevent it from positioning as many sleeves as possible within a given unit of time. For example, the entire tool must be robotically re-positioned in the tubesheet whenever a new tube is to be sleeved.

A device which provides a more rapid sleeving operation is described in U.S. Pat. application Ser. No. 006,845 filed Jan. 27, 1987 now U.S. Pat. No. 4,829,648, by Thomas Arzenti et al. and assigned to the Westinghouse Electric Corporation, and which is completely incorporated herein by reference. Here, a double action hydraulic cylinder that is capable of translating the frame which carries a pair of hydraulically operated grippers, one of which is reciprocably movable with respect to the other, into engagement with the tube sheet after the assembly has been pivoted into alignment with the damaged tube. The device is capable of servicing a number of tubes with a single insertion of the mounting mechanism.

However, during the insertion of the sleeve, undesirable reverse forces are exerted on the tube being serviced, the adjacent tubes as well as, the frame and the robotic arm which positions the sleeving assembly beneath the sheet. These forces result from the close fit between the sleeve and the tube itself. During the feeding of the sleeve, the smallest misalignment between the sleeve and the tube may cause the sleeve to jam within this tube. To relieve such a jam, the maintenance operator may have to apply forces which create even greater stresses on the tubes and the tool of Arzenti. This greater force exerted by the tool is absorbed by the positioning arm as well as the tube being serviced and the adjacent tubes by way of the gripping units, and may result in further damage to these tubes as well as damage to the positioning arm. Also, because there is often not a smooth feeding of the sleeve into the tube being serviced, the time required to complete the servicing of the tube is increased.

Clearly, there is a need for an improved sleeving device capable of installing reinforcing sleeves in heat exchanger tubes in shorter time periods while minimizing the loads exerted on the positioning tool and the tubes of the tubesheet. Ideally, such a device should be easily and remotely manipulable within the radioactive environment of the primary side of the generator by means of commercially available robotic arms. Furthermore, it would be desirable if the operation of the device provided reliable positioning of the tool with respect to the tubesheet and provided for the smooth insertion of the sleeve so that the entire operation was substantially accelerated, and the maintenance operator's exposure to potentially harmful radiation was minimized.

SUMMARY OF THE INVENTION

Generally speaking, the invention is a tool for remotely inserting and positioning a sleeve within a selected tube of a tubesheet across a damaged section of the selected tube. The tool comprises a frame, a mounting means for detachably and pivotably mounting the frame in close proximity to the selected tube in the tubesheet, an advancing assembly supported by the frame for remotely inserting and advancing the sleeve to a selected axial position within the selected tube to be serviced, a drive means for pivotally positioning the advancing assembly into alignment with the open end of the selected tube, and means for relieving reverse forces which are exerted on the tool generally by friction between the sleeve and the selected tube and for aiding the advancing assembly in the inserting and feeding of the sleeve.

The mounting means includes first and second securing collets capable of expandably locking themselves within the open end of tubes within the tubesheet in close proximity to the selected tube. The first of these collets further includes a bearing for pivotally mounting the securing collet to the frame. In the preferred embodiment, the securing collets are part of hydraulically expandable cam-lock devices. These expandable camlocks include a displacement means in the form of a double action hydraulic cylinder for selectively moving the frame from a non-contacting to a contacting position with respect to the tubesheet. This displacement means allows the advancing assembly to be freely pivoted into alignment with the tube to be serviced without any mechanical interference, and then abuts and presses the frame against the underside of the tubesheet.

The advancing assembly may include upper and lower grippers, the lower of which is reciprocably movable with respect to the upper in order to incrementally advance the sleeve to a desired axial position within the tube to be serviced. Each of the grippers may further include a resilient bladder that is selectively expandable into engagement with the sleeve. The upper and lower grippers are preferably maintained in alignment with one another by means of guide rods, and a double action hydraulic cylinder is preferably utilized to reciprocate the lower gripper with respect to the upper gripper, which is mounted on a support plate of the frame.

The drive means may include the combination of a drive train and an electric motor. In a preferred embodiment one of the gears of the drive train is concentrically disposed around both the first securing collet and the bearing, and is securedly fastened to an upper support plate of the frame. The balance of the drive train is configured so that when the electric motor is actuated, the entire frame rotates about the bearing, thereby pivotally moving the advancing assembly in a circular path about a center axis of the first securing mechanism in order to align the advancing assembly with the tube to be serviced.

The means for relieving reverse forces include the above-mentioned pressing of the frame against the underside of the tubesheet, as well as a vibrating means mounted on the advancing assembly for vibrating the advancing assembly during the insertion and feeding of the sleeve within the selected tube. Preferably, the vibrating means is mounted adjacent the lower gripper of the advancing assembly so as to vibrate the lower gripper to reduce the friction acting on the sleeve during the feeding process.

In operation, the sleeve-loading tool of the invention is remotely attached to the open end of a first tube in a tubesheet which is in close proximity to that tube to be serviced. The sleeve-loading tool is positioned by way of a robotically controlled armature. This armature remotely inserts the first securing collet into the first tube, and the securing collet is expanded into engagement therewith. This first tube is chosen such that the distance between it and a selected damaged tube is the same as the radial distance between the upper gripper of the advancement assembly and the centerline of the first securing collet. After the first securing collet is expandably attached to the open end of the first tube, the frame is then pivotally rotated about the centerline of the first securing collet by actuating the motor of the drive train. When the upper gripper of the advancing assembly is aligned with the open end of the selected tube, the motor is de-actuated. At this point, the second securing collet will be aligned with a second tube in close proximity to the selected tube, and the hydraulic cylinder of the second securing collet is actuated to insert and expand the second securing collet within the second tube. The hydraulic cylinders of each of the displacement means are then actuated such that the front comes into contact with and pressingly engages the underside of the tubesheet. This will reliably position the frame orthogonally with respect to the tubes in the tubesheet and will also align the upper gripper of the advancing assembly with the open end of the selected tube. The advancing mechanism is then actuated so that the reciprocating bottom gripper, in co-action with the stationary top gripper, incrementally advances the sleeve to the desired position across the damaged portion of the selected tube. During the advancement, the bottom gripper is vibrated so as to relieve reverse forces acting on the tool and to expedite the feeding of the sleeve. The combination of a dual securing mechanism, one of which is pivotally mounted within the frame, a drive means for selectively pivoting the advancing assembly into alignment with a tube to be sleeved, and a vibrating means for easing the feeding of the sleeve within the selected tube, not only makes it easier for the operator of the robotic arm to position the tool on the tubesheet, and obviates the need to remount the securing means in a tubesheet with every sleeving operation, but also insures a smooth feeding of the sleeve within the tube to be serviced. In doing so, the sleeving operation is greatly accelerated, the likelihood of jamming of the sleeve within the tube to be serviced is minimized, resulting in less operator interaction, thereby substantially reducing the radiation exposure time of the maintenance operation.

DETAILED DESCRIPTION OF THE PREFERRED EMBODIMENT

General Overview of the Structure and Function of the Invention

Figure 1:
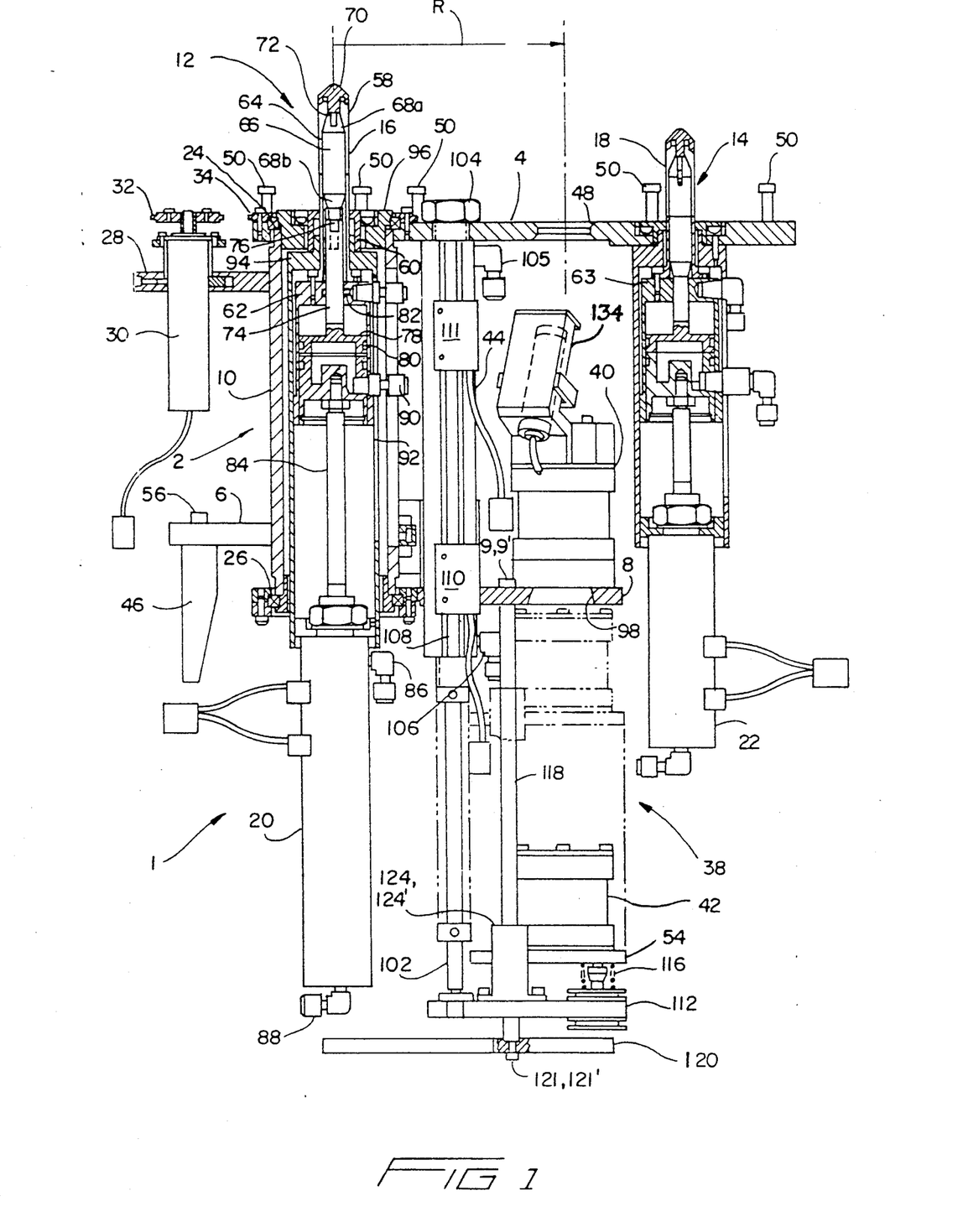
FIG. 1 is a partial cross-section elevational view of the sleeve loading tool in accordance with a preferred embodiment of the invention.

With reference now to FIG. 1, wherein like numbers designate like compounds throughout all of the several figures, the general purpose of the sleeve loading tool 1 of the invention is to install a sleeve in the tubesheet of a nuclear steam generator (not shown). To this end, the tool 1 has a frame 2 formed from an upper support plate 4, lower support plate 8, and a tubular housing 10. On one end of the upper support plate 4, a first mounting mechanism 12 is provided and at the other end of the upper support plate 4, a second mounting mechanism 14 is provided. Each of mounting mechanisms 12 and 14 include a hydraulically expandable securing collet 16 and 18, respectively. These collets may be extended or retracted toward or away from the upper support plate 4 of the frame 2 by translation cylinders 20 and 22, respectively, in order to move the frame 2 toward or away from a tubesheet of a steam generator. The first mounting mechanism 12 is pivotably mounted within the upper support plate 4 and the lower support plate 8 by way of upper and lower ring shaped bearings 24 and 26 which circumscribe the mounting mechanism 12. Rigidly attached to the tubular housing 10 is support plate 28. The support plate 28 is provided to accommodate a drive mechanism 30. This drive mechanism 30 includes a drive sprocket 32 which is drivingly engaged with the driven sprocket 34 which circumscribes the mounting mechanism 12 and is rigidly secured to the upper support plate 4. A drive chain 36 shown in FIG. 2, forms a drive train which is provided for pivotably moving an advancing assembly 38 about the center axis of the mounting mechanism 12 in order to position the assembly directly under a selected tube to be serviced, as well as to position the second mounting mechanism 14 in alignment with an additional adjacent tube. The advancing assembly 38 includes an upper gripper 40 which is stationarily mounted to the lower support plate 8 beneath the upper support plate 4, and a lower gripper 42 which is reciprocably movable beneath the upper gripper 40 by means of a double action hydraulic cylinder 44. Each of the grippers, 40 and 42, may be of the selectively expandable bladder type, including an expandable bladder formed from a resilient plastic.

The gripping assembly is initially positioned beneath a tubesheet by way of a robotic arm (not shown) which contacts the wedge 46. The robotic arm inserts the first mounting mechanism 12 into a tube of the tubesheet which is spaced a selected distance R from that tube to be serviced. Once the mounting mechanism 12 is inserted into the tube, the expandable securing collet 16 expands to contact the interior of the tube and secure the assembly. With the second mounting mechanism 14 in its retracted position, the driving mechanism 30 is actuating in order to pivot the frame 2 about the center line of the mounting mechanism 12 until the chamfered opening 48 of the advancing assembly 38 is in precise alignment with the open end of the tube to be serviced. In doing so, the second mounting mechanism 14 will be in alignment with a further adjacent tube of the tubesheet and the translation cylinder 22 is actuated to insert the expanding securing collet 18 into the adjacent tube. This collet is then expanded to further secure the frame 2 beneath the tubesheet. Once the second mounting mechanism 14 is secured, each of the translation cylinders 20 and 22 are retracted to pull the tool upwardly such that the abutment shoulders 50 abut against the tubesheet and each of the mounting mechanism apply approximately 200 pounds of force to align the tool orthogonally with respect to the tubesheet.

Figure 3:
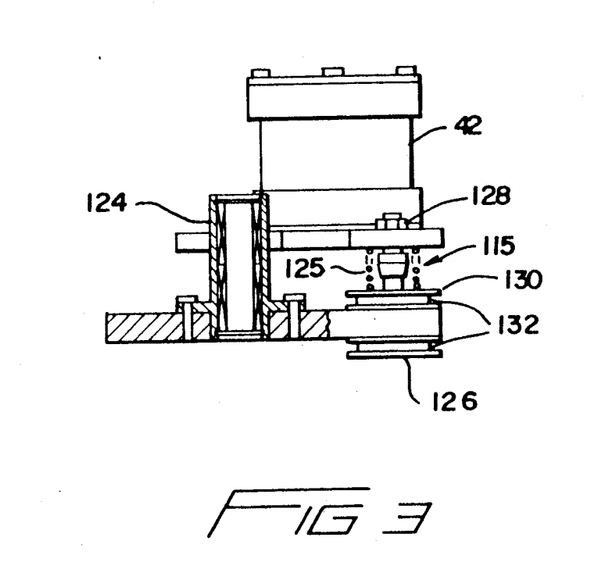
FIG. 3 is a partial cross-section elevational view of a portion of the sleeve loading tool of FIG. 1.
Figure 4:
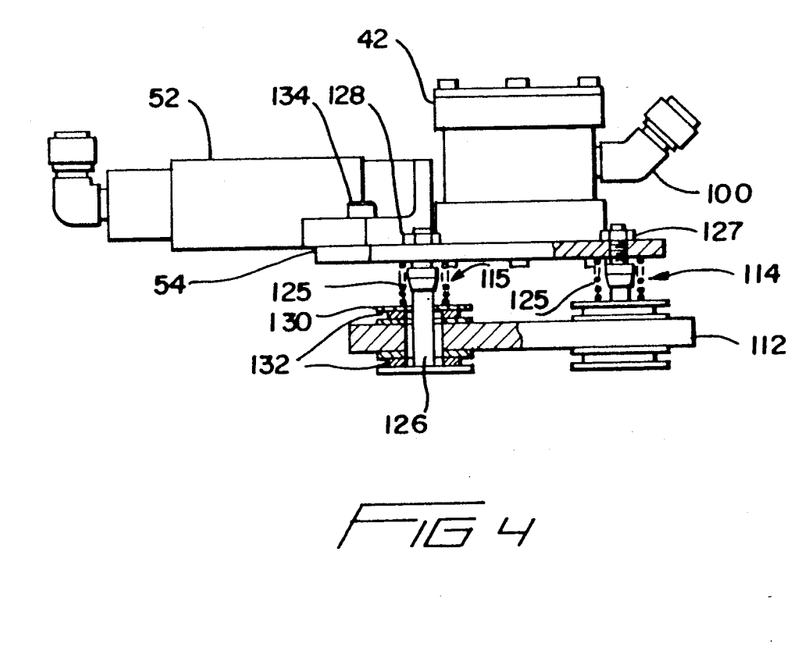
FIG. 4 is a partial side view of that portion of the sleeve loading tool shown in FIG. 3.
Figure 5:
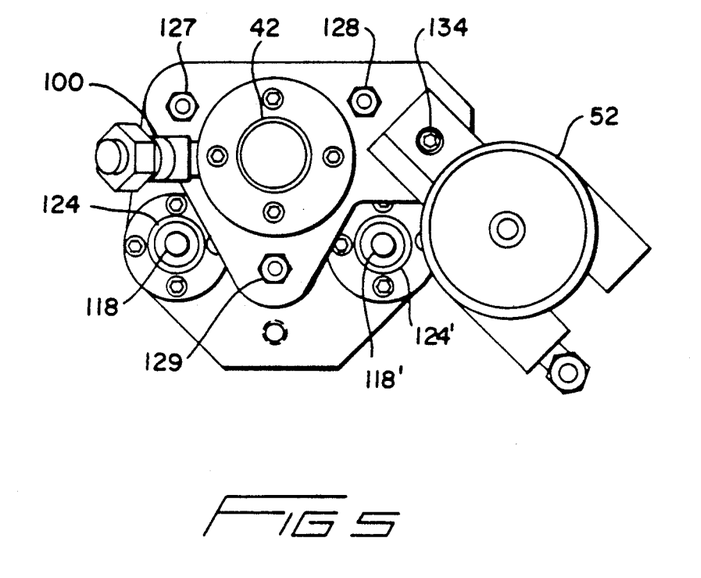
FIG. 5 is a top view of that portion of the sleeve loading tool shown in FIG. 3.

It is at this point that a sleeve may be fed by the gripping assembly 38 into the tube to be serviced within the tubesheet. In order to aid in and expedite the feeding of the sleeve into the tube to be serviced, an oscillatory fixture 52 is provided as shown in FIGS. 3, 4 and 5. Oscillatory fixture 52 as well as the lower gripper 42 are mounted on a lower gripper support plate 54. The actuation of the oscillatory fixture 52 acts to vibrate the lower gripper support plate 54 and consequently the lower gripper 42, during the feeding of the sleeve into the tube to be serviced. In doing so, the sleeve can be expeditiously fed into the tube.

By properly choosing the adjacent tube in which to insert the mounting mechanism 12, additional tubes which need servicing which are also located the distance R from the center line of the securing mechanism 12 may be conveniently sleeved without repositioning the securing mechanism 12 by way of the robotic arm.

SPECIFIC DESCRIPTION OF THE STRUCTURE AND OPERATION OF THE INVENTION

With reference to FIG. 1, the frame 2 of the sleeve loading tool 1 includes both the previously mentioned upper and lower support plates 4, and 8 that are interconnected by the tubular housing 10, and a mounting bracket 6 that holds a wedge 46 for selectively connecting and disconnecting the tool 1 from the previously mentioned robotic arm in the conventional manner. The wedge 46 is secured onto the mounting bracket 6 by means of a bolt 56 as shown. In the preferred embodiment, the specific robotic arm used is a No. 51-1-13 SM-10W series arm manufactured by Zetec, Inc. located in Issaquam, WA. Additionally, in order to minimize the stress on the arm, all parts of the frame 4 are formed from a lightweight metal such as aluminum.

As is best be seen in FIG. 1, the first mounting mechanism 12 includes the previously mentioned securing collet 16 for detachably mounting the tool 1 to the interior of an adjacent heat exchanger tube (not shown). The top end of this securing collet 16 is split into a plurality of expandable fingers 58, while the bottom end terminates in a mounting flange 60 that is connected to the upper surface of a collet expansion cylinder 62. Located within the interior of the securing collet 16 is a cam actuator 64 having a cylindrical central portion 66 that terminates in top and bottom frustroconical ends 68a, 68b. The upper portion of the resilient fingers 58 includes a taper that is complementary in shape to the frustroconical surface of the upper end 68a for a purpose which will be described in more detail presently. A tapered nosepiece 70 is connected to the top of the upper frustroconical end 68a by a threaded stud portion 72 of the nosepiece 70, while an actuator shaft 74 is connected to the bottom surface of the lowermost frustroconical end 68b by means of a threaded stud 76. The actuator shaft 74 is in turn connected to the piston 78 of the previously mentioned collet-expansion cylinder 62. An O-ring 80 circumscribes the piston 78 in order to create an air-tight seal between the piston 78 and the cylinder 62. Additionally, a shaft seal 82 is provided at the upper end of the cylinder 62 to create an air-tight seal between this shaft 74 and the upper walls of cylinder 62.

The entire collet-expansion cylinder 62 is concentrically disposed within the tubular housing 10. The bottom of the expansion cylinder 62 is threadingly connected to a rod 84 of the hydraulic translation cylinder 20. In the preferred embodiment, the hydraulic cylinder 20 is a double-action cylinder having an upper air coupling 86 and a lower air coupling 88.

Like translation cylinder 20, the collet-expansion cylinder 62 includes an air coupling 90 for selectively injecting or relieving compressed air from the bottom of the piston 78. At its outer end, the air coupling 90 extends through an elongated slot 92 provided along the side of the tubular housing 10. On its inner end, the air coupling 90 includes a threaded exterior that may be screwed into the bottom most portion of the collet-expansion cylinder 62. A guide collar 94 is provided at the uppermost portion of the tubular housing 10 to guide the longitudinal motion of the securing collet 16. It should be noted that the upper bearing 24 pivotally connects the collar 96 and upper end of the tubular housing 10 with the upper support plate 4, while a lower bearing 26 pivotally connects the lower end of the tubular housing 10 with the lower support plate 8. Hence the upper and lower bearings 24, 26 render the mounting mechanism 12 and the tubular housing 10 pivotally movable with respect to the rest of the frame 2.

In operation, the collet expansion cylinder 62 extends or retracts the individual fingers 58 of the expansion collet 16 by sliding the upper frustroconical end 68a of the cam actuator 64 into or away from the upper, tapered portions of the fingers 58, respectively. Independent of this mechanical action, the translation cylinder 20 extends or withdraws the securing collet 16 away from or toward the frame 2 of the tool 1 by translating the entire collet expansion cylinder 62 along the longitudinal axis of the tubular housing 10. When the tool 1 is first mounted within an adjacent tube of a tubesheet, the translation cylinder 20 positions the collet-expansion cylinder 62 at its uppermost position with respect to the tubular housing 10. In order to secure the tool 1 within the tubesheet, compressed air is admitted through the air coupling 90 to push the actuator shaft 74 upwardly, thereby spreading the resilient fingers 58 of the collet 16 into an engaging position against the inner wall of the adjacent tube. Thus positioned, neither the abutment shoulders 50 nor any other part of the upper support plate 4 contacts any portion of the tubesheet, and the entire frame 2 of the tool 1 is free to rotate about the center axis of the securing collet 16 without mechanical interference. However, once the chamfered opening 48 of the advancing mechanism 38 is aligned with the tube to be serviced and the collet 18 of the second mounting mechanism 14 is aligned with another adjacent tube, translation cylinder 22 is activated to insert the collet 18 therein. At this time, the translation cylinders 20 and 22 are actuated to withdraw the collet expansion cylinders 62 and 63 downwardly with respect to the top plate 4, thereby pulling the entire frame 2 toward the tubesheet until the abutment shoulders 50 engage the tubesheet in order to properly position the tool 1 orthogonally with respect to the tubesheet thereby creating a stable, multi-point contact between the upper support plate 4 of the frame 2 and the lower surface of the tubesheet. In doing so, any positioning inaccuracies are alleviated.

The collet expansion cylinders 62 and 63 of the respective mounting mechanisms are designed such that upon the withdrawal of the expansion cylinders 62 and 63, and after contact has been made between the abutment shoulders and the underside of the tubesheet, the cylinders continue their withdraw until 150 lbs. to 300 lbs. of force, and preferably 200 lbs. of force act on the underside of the tubesheet. This force is also to be maintained during the operation of the sleeving tool.

In order to pivotally move the frame 2 around the securing collet 16 of the mounting assembly 12, a drive train is provided. This drive train is formed from a driven sprocket 34 that circumscribes the mounting assembly 12, and a drive sprocket 32 that is in turn powered by the shaft of the driving mechanism 30 with the two being connected by way of the drive chain 36. The driving mechanism 30 is in turn secured onto the housing 10 by support plate 28.

Figure 2:
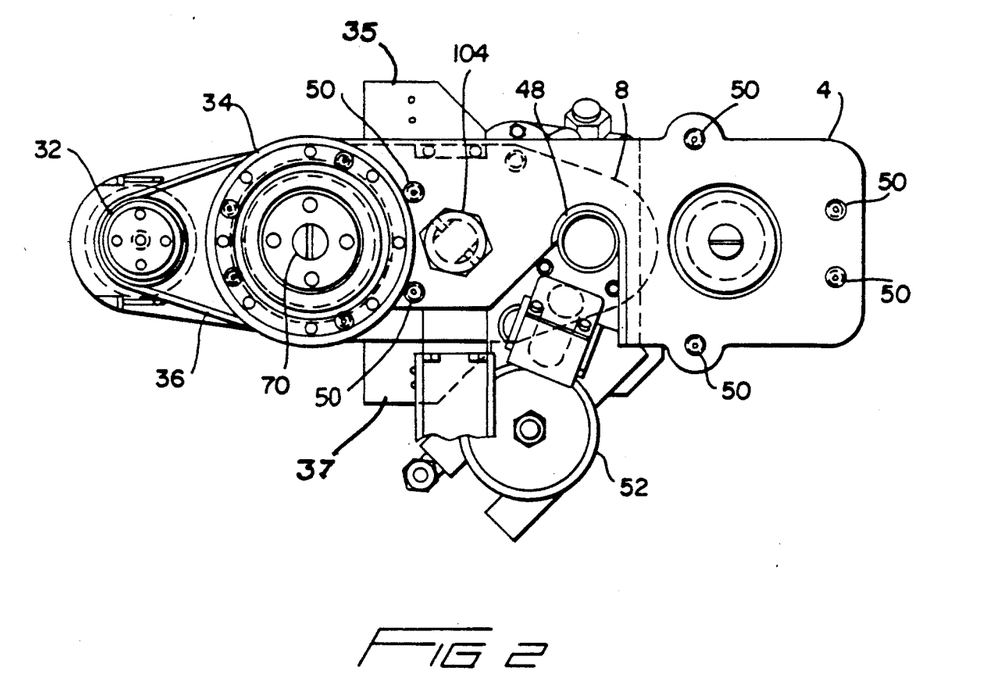
FIG. 2. is a top view of that device shown in FIG. 1.

As may best be seen with respect to the FIG. 2, a clockwise motion of the drive sprocket 32 will cause the top support plate 4 of the frame 2 to move in a counter-clockwise direction, while the reverse is true if the drive sprocket is driven in a counterclockwise direction. This clockwise and counterclockwise rotation of the frame 2 is monitored by limit switches 35 and 37 which are mounted on the lower support plate 8.

The advancing assembly 38 of the tool 1 includes an upper gripper 40 and a lower gripper 41. The upper gripper 40 is stationarily mounted between the upper and lower support plates 4 and 8 of the frame 2. The bottommost portion of the upper gripper 40 is secured onto the lower support plate 8.

To grip a sleeve, the interior of the upper gripper 40 is lined with a resilient bladder that may be selectively expanded into engagement with the sleeve by compressed air in a manner which is known and described in U.S. Pat. application Ser. No. 006,845. Therein, the resilient bladder is injection molded from Pelethane compound No. 2363-80A available from the CPR Division of Upjohn Chemicals, Inc. located in LaPorte, TX. The central portion of the resilient bladder is tubular, while the end portions terminate in upper and lower sealing flanges. These upper and lower sealing flanges are received into annular recesses present around the ends of the cylindrical housing which forms the exterior of the gripper 40. When the resilient bladder is mounted within the cylindrical housing, the tubular central portion of the bladder is spaced a small distance away from the inner wall of the cylindrical housing to form an annular space. In order that pressurized air may be conducted to the annular space, the housing includes a transversely disposed threaded bore for receiving an air coupling. When pressurized air is admitted into the the annular space, the bladder flexes into the gripping position. Conversely, when the annular space is relieved of this pressurized air, the bladder reassumes its unflexed, non-gripping shape. In order to sealingly engage the upper and lower sealing flanges of the resilient bladder against the upper and lower ends of the cylindrical housing, both a lower retaining ring and an upper ring are provided on the top and bottom of the housing respectively. It should be noted that the cylindrical interior of the bladder of the lower gripper is positioned into alignment with the chamfered opening 98 located in the lower support plate 8.

Like the upper gripper 40, the lower gripper 42 also includes an upper retaining ring that is secured onto a cylindrical housing by means of screws. Likewise, an air coupling 100 is provided at approximately the middle of this housing. Finally, a lower retaining ring is sandwiched between the lower end of the cylindrical housing and the lower gripper support plate 54 upon which the lower gripper 42 rests. Since the internal structure of the lower gripper 42 is identical to the internal structure of the upper gripper 40, which is conventional, no further description of the lower gripper 42 need be made.

The reciprocating lower gripper support plate 54 of the advancing assembly 38 is connected at one end to the output rod 102 of the reciprocating cylinder 44. In the preferred embodiment, reciprocating cylinder 44 is a model No. MRS-096-DXPZ double-action hydraulic cylinder manufactured by the Bimba Manufacturing Company located in Monee, IL. This particular model of hydraulic cylinder has a magnetized piston head (not shown) for a control function which will be discussed in detail hereinafter. The bottom end of the reciprocating cylinder 44 includes the previously mentioned output rod 102 which is connected to the reciprocating lower gripper support plate 54. The upper end of the reciprocating cylinder 44 terminates in a threaded fitting that allows the cylinder 44 to be secured onto the upper support plate 4 of the frame 2 by way of nut 104. The reciprocating cylinder 44 also includes top and bottom air fittings 105, 106, respectively, for injecting pressurized air against the top and bottom faces of the magnetic piston contained therein. As is best seen with respect to FIG. 1, a switch mounting rail 108 is secured along one side of the reciprocating cylinder 44 along its longitudinal axis. Magnetic switches 110 and 111, are slidably mounted onto this switch rail 108 so that, during the operation of the device, the strokes of the magnetic piston contained within the reciprocating cylinder 44 can be positively monitored. The switches are model no. MRS-087 switches manufactured by Globe Motors located in Dayton, OH.

As can best be seen in FIGS. 3 and 4, the lower gripper support plate 54 is resiliently mounted on a base plate 112 by way of the resilient couplings 114 and 115 (a third resilient coupling is not shown). The base plate 112 is slidably mounted upon a pair of parallel guide rods 118 and 118' as can be seen in FIGS. 1 and 5. The top ends of each of the guide rods 118 and 118' are secured within recesses present in the bottom support plate 8 by means of screws 9 and 9', respectively. The bottom ends of the guide rods 118 and 118' are similarly secured in recesses present in a guide plate 120 and secured therein by means of screws 121 and 121', respectively. In order to minimize friction between the guide rods 118 and 118' and the base plate 120, a pair of linear bearing assemblies 124 and 124' are mounted on the base plate 112 as shown.

The resilient couplings 114 and 115 each include a coil spring 125 which is provided concentrically about a guide 126. The guide 126 is securely fasten to the lower gripper plate 54 by way of nuts 127, 128 and 129. The coil springs 125 exert an expansive force between the lower gripper plate 54 and the base plate 112. The positioning of the guide 126 relative to the base plate 112 is maintained by way of a locator 130 and bearings 132. Therefore, the base plate 112 is capable of reciprocating along the shaft 118 while the lower gripper plate and the lower gripper are resiliently carried along therewith.

Lower gripper plate 54 is resiliently mounted with respect to the base plate 112 so as to allow for the vibration of the lower gripper 42 by way of the oscillatory fixture 52. The oscillatory fixture, or vibrator, is a pneumatic vibrating mechanism, model no. BB5160 and manufactured by Bibco Vibration Products, Inc., located in Wyoming, RI. The vibrator 52 is fixedly secured to the lower gripper plate 54 by way of screw 134. The vibrator 52 is provided such that during the feeding of the sleeve into the tube to be serviced, the lower gripper 42 can be vibrated so as to vibrate the sleeve being inserted. The vibrator 52 is also provided to bring the sleeve into compliance with the tube to be serviced. By resiliently mounting the lower gripper 42, this gripper is capable of travel in x-y plane of the gripper, as well as rotation about the x-y axis thereby aiding in positioning the sleeve orthogonal relative to the tube to be serviced. This vibration will aid in the speed at which the sleeve may be inserted and also relieve much of the reverse forces exerted on the tool because of jamming of the sleeve within the tube due to the small tolerance between the sleeve and the tube to be serviced.

After the operator of the tool 1 has selected a securing tube, he then manipulates the robotic arm (not shown) so that the resilient fingers 58 of the securing collet 16 are completely extended up into the mouth of the selected tube. He then activates the collet expansion cylinder 62 by admitting pressurized air through the coupling 90. The admission of such pressurized air has the effect of pushing the piston 78 upwardly, which in turn pushes the upper frustoconical end 68a of the cam actuator 66 against the tapered ends of the resilient fingers 58. This in turn, causes the fingers to expand outwardly into engagement with the inner walls of the selected tube. During each of the foregoing steps, the rod 84 of the translation cylinder 20 has been extended so that the expansion cylinder 62 is in the uppermost position. Once the tool 1 has been secured into engagement within the selected tube of the tubesheet, the robotic arm may be decoupled from the mounting bracket 6; however, this is not necessary. At this junction, the drive mechanism 30 is actuated in order to pivot the frame 2 about the center line of the mounting mechanism 12 until the chamfered opening 48 of the advancing assembly 38 is aligned with the open end of the tube to be serviced. During this step, a television camera 134 is used to monitor the relative positions of the chamfered opening 48 and the tube to be serviced. When alignment is obtained, the drive mechanism is then deactuated. This alignment further aligns the second mounting mechanism 14 with an additional adjacent tube. At this point, the translation cylinder 22 is actuated to extend the securing collet 18 into the adjacent tube. Actuation of the second mounting mechanism's expandable fingers is done in the same manner as that of the first mounting mechanism. Once the second mounting mechanism is secured within the adjacent tube, the translation cylinders 20 and 22 are activated so as to retract the collet expansion cylinders 62 and 63 and draw the tool, and particularly the abutment shoulders 50 into contact with the lower surface of the tubesheet. This retraction is continued until a force of approximately 200 lbs. is exerted on a lower surface of the tubesheet by the abutment shoulders. This will ensure that the tool 1 is orthogonally aligned with respect to the tubesheet.

Following the alignment steps, the operator of the device loads a sleeve in the manner as discussed in U.S. Pat. application Ser. No. 006,845. This sleeve is gripped by the lower gripper 42 and incrementally fed through the advancing assembly 38 and into the open end of the tube to be serviced with the aid of the vibrator fixture 52. The distance to which the sleeve is loaded into the tube to be serviced may be calculated by either counting the number of strokes of the reciprocating cylinder 44 over time, or by observing the position of the bottom edge of the sleeve with respect to the open end of the tube being sleeve. Such an observation can be carried out by use of a camera 134 mounted on an upper portion of the upper gripper 40. When the sleeve has been fed in the position across the corroded section of the tube, the advancing assembly 38 is de-actuated, and a hydraulic mandrel (not shown) is used to expand the sleeve into place across the corroded section of the tube, thereby installing a hydraulic bridge across the weakened section of the tube.

It is during this sleeving process that the sleeve being fed by way of the advancing assembly 38 can become unaligned or jammed within the tube to be serviced. However, by forcibly securing the tool beneath the tubesheet and vibrating the lower gripper during the feeding of the sleeve within the tube, the sleeve can be both accurately and quickly fed into the tube to be sleeved.

I claim:

1. An apparatus for remotely inserting and feeding a sleeve within a selected tube to be serviced mounted in a tubesheet of a steam generator and for relieving reverse forces exerted on the apparatus and said tubesheet, comprising
   a frame means,
   a mounting means for mounting said frame means adjacent to said tubesheet,
   an advancing assembly supported by said frame means for remotely inserting and feeding said sleeve within said selected tube, and
   means for relieving said reverse forces exerted on said frame means generated by friction between said sleeve and said selected tube and for aiding said advancing assembly in said inserting and feeding of said sleeve, said means for relieving said reverse forces including fixing means for fixing said frame means with respect to said tubesheet.

2. An apparatus for remotely inserting and feeding a sleeve within a selected tube to be served mounted on a tubesheet of a steam generator comprising a tool including a frame means, mounting means for detachably suspending said frame means from a tube in close proximity to said selected tube, and an advancing assembly mounted on and supported by said frame means a fixed distance from said mounting means for remotely inserting and feeding said sleeve toward and into said selected tube, the improvement comprising; means for relieving reverse forces exerted on said tool generated by friction between said sleeve and said selected tube and for aiding said advancing assembly in feeding said sleeve, said means for relieving said reverse forces including fixing means for fixing said frame means with respect to said tubesheet.

3. The apparatus as defined in claim 2, wherein said mounting means includes at least one gripper unit with said gripper unit having a gripping means extending from a top plate of said tool and parallel to the direction of advancement of said sleeve.

4. The apparatus as defined in claim 3, wherein said gripper unit includes actuating means for actuating said gripping means within said tube in close proximity with said selected tube.

5. The apparatus as defined in claim 4, wherein said fixing means includes means for retracting said gripping means toward said top plate and forcibly positioning said tool against said tubesheet.

6. The apparatus of claim 5, wherein said top plate includes a plurality of abutment shoulders which forcibly contact said tubesheet and reliably align said tool orthogonally relative to said tubesheet.

7. The apparatus of claim 5, wherein said means for relieving said reverse forces further includes a vibrating means mounted on said advancing assembly for vibrating said advancing assembly to reduce the friction acting on said sleeve during said inserting and feeding of said sleeve.

8. The apparatus as defined in claim 2, wherein said means for relieving said reverse forces includes a vibrating means mounted on said advancing assembly for vibrating said advancing assembly during said inserting and feeding of said sleeve to reduce the friction acting on said sleeve.

9. The apparatus as defined in claim 8, wherein said advancing assembly includes first and second selectively actuatable grippers, at least one of which is reciprocably movable with respect to the other.

10. The apparatus of claim 9, wherein said reciprocably movable gripper is mounted on a support plate having bearing means thereon for slidably engaging a guide shaft and said vibrating means is mounted on said support plate for vibrating said reciprocably movable gripper.

11. An apparatus for remotely inserting and feeding a sleeve within a selected tube to be serviced mounted in a tubesheet of a nuclear steam generator comprising;
    a tool including a frame means, mounting means for detachably and rotatably suspending said frame means from a first tube in close proximity to said tube to be serviced, and an advancing assembly mounted on and supported by said frame means for remotely inserting and feeding said sleeve into said selected tube;
    a positioning means for positioning said tool adjacent said tubesheet and positioning said mounting means in alignment with said first tube; and
    means for relieving reverse forces exerted on said tool said tubesheet and said positioning means, generated by friction between said selected tube and said sleeve during said feeding of said sleeve, and for aiding said advancing assembly in said inserting and feeding of said sleeve, said means for relieving said reverse forces including fixing means for fixing said frame means with respect to said tubesheet.

12. The apparatus of claim 11, wherein said mounting means includes at least one gripper unit with said gripper unit having a gripping means extending from a top plate of said tool and parallel to the direction of advancement of said sleeve.

13. The apparatus of claim 12, wherein said gripper unit includes actuating means for actuating said gripping means within said first tube.

14. The apparatus of claim 13, wherein said fixing means includes means for retracting said gripping means toward said top plate and forcibly positioning said tool against a lower of said tubesheet.

15. The apparatus of claim 14, wherein said top plate includes a plurality of abutment shoulders which forcibly contact said tubesheet and reliably align said tool orthogonally relative to said tubesheet.

16. The apparatus of claim 15, wherein said means for relieving said reverse forces further includes a vibrating means mounted on said advancing assembly for vibrating said advancing assembly to reduce the friction acting on said sleeve during said inserting and feeding of said sleeve.

17. The apparatus of claim 11, wherein said means for relieving said reverse forces includes a vibrating means mounted on said advancing assembly for vibrating said advancing assembly during said inserting and feeding of said sleeve to reduce the friction acting on said sleeve.

18. The apparatus as defined in claim 17, wherein said advancing assembly includes first and second selectively actuatable grippers, at least one of which is reciprocably movable with respect to the other.

19. The apparatus of claim 18, wherein said reciprocably movable gripper is mounted on a support plate having bearing means thereon for slidably engaging a guide shaft and said vibrating means is mounted on said support plate for vibrating said reciprocably movable gripper.

20. The apparatus of claim 11, wherein said mounting means includes first and second gripper units each having a gripping means extending from a top plate of said tool in the direction of advancement of said sleeve with said first gripper unit being rotatably mounted on said tool, said tool further comprising a rotating means for rotating said advancing assembly and said second gripper unit about a central axis of said first gripper unit to align said advancing assembly with said selected tube and to align said second gripper unit with a second tube in close proximity to said selected tube.

21. A process of positioning a sleeve loading tool adjacent a tubesheet in a steam generator and feeding a sleeve into a selected tube to be serviced within said tubesheet, so as to relieve reverse forces exerted within said tubesheet and on said tool, and to minimize operator interaction, comprising the steps of:
providing a sleeve loading tool including first and second gripper units each having gripping means extending from a top plate of said tool, with said tool being rotatable about a central axis of said first gripper unit,
positioning said tool adjacent to said tubesheet,
inserting said gripper means of said first gripper unit into a first tube in close proximity to said selected tube;
actuating said gripping means of said first gripper unit to grip within said first tube;
rotating said tool about said central axis said first gripper unit to align said tool with said selected tube and to align said gripping means of said second gripper unit with a second tube in close proximity with said selected tube of said tubesheet;
inserting said gripping means of said second gripper unit into said second tube;
actuating said second gripper unit to grip within said second tube;
drawing said tool into abutment with a lower surface of said tubesheet;
pressing and maintaining said tool against said lower surface of said tubesheet with a force sufficient enough to counteract said reverse forces exerted on said tool,
feeding said sleeve into said selected tube by way of a feeding assembly; and
vibrating said feeding assembly during the feeding of said sleeve to smoothly feed said sleeve into said selected tube to be serviced so as to relieve the reverse forces exerted on said tool and within said tubesheet.

22. A process of positioning a sleeve loading tool adjacent a tubesheet in a steam generator and relieving reverse forces exerted within the tubesheet and on the tool generated during the feeding of a sleeve into a selected tube in the tubesheet, comprising the steps of:
providing at least one gripper unit having gripping means extending from a top plate of the tool;
inserting said gripping means into a first tube in close proximity to the selected tube;
actuating said gripping means to grip within said first tube;
drawing the tool into abutment with a lower surface of the tubesheet,
pressing the tool against the lower surface of the tubesheet; and
feeding a sleeve into the selected tube;
wherein the tool is pressed against the lower surface of the tubesheet with a force sufficient enough to counteract and relieve the reverse forces exerted within the tubesheet and on the tool during said step of feeding the sleeve into the selected tube.

23. The process as defined in claim 22, wherein said gripping means includes a plurality of fingers, and said step of actuating said gripping means includes diverging said plurality of fingers into contact with an inner portion of said adjacent tube.

24. The process as defined in claim 22, wherein the tool includes two of said gripper units and said gripping means of each of said units are inserted into different tubes in close proximity to the selected tube.

25. The process as defined in claim 24, wherein said process further includes the steps of rotating said tool about a central axis of a first of said two gripper units to align the tool with the selected tube to be serviced and to align said second of said two gripper units with a second tube in close proximity with the selected tube to be serviced after said gripping means of said first griper unit has been actuated, inserting said second gripper unit into said second tube, and actuating a gripper means of said second gripper unit to grip within said second tube.

26. The process as defined in claim 22, further including the step of vibrating said tool during the feeding of said sleeve.

27. The process as defined in claim 22, wherein the tool includes a plurality of abutment shoulders extending from the top plate of the tool and parallel to said gripping means, and the step of drawing said tool into abutment with said tube sheet includes abutting said abutment shoulders against said tubesheet so as to orthogonally align said tool with respect to said tube sheet.

28. The process as defined in claim 22, wherein the force exerted on said lower surface of said tubesheet is approximately 200 pounds, and said force is maintained throughout the duration of the feeding step.

* * * * *